(12) United States Patent
Panje

(10) Patent No.: US 9,172,990 B2
(45) Date of Patent: Oct. 27, 2015

(54) METHOD AND DEVICE FOR OPTIMIZING STORAGE OF RECORDED VIDEO PROGRAMS

(75) Inventor: Krishna Prasad Panje, Bangalore (IN)

(73) Assignee: Google Technology Holdings LLC, Mountain View, CA (US)

(*) Notice: Subject to any disclaimer, the term of this patent is extended or adjusted under 35 U.S.C. 154(b) by 286 days.

(21) Appl. No.: 13/168,392

(22) Filed: Jun. 24, 2011

(65) Prior Publication Data
US 2012/0328267 A1    Dec. 27, 2012

(51) Int. Cl.
| | |
|---|---|
| H04N 9/80 | (2006.01) |
| H04N 21/4335 | (2011.01) |
| H04N 21/4147 | (2011.01) |
| H04N 21/442 | (2011.01) |
| H04N 5/781 | (2006.01) |
| H04N 5/76 | (2006.01) |

(52) U.S. Cl.
CPC ............ *H04N 21/4335* (2013.01); *H04N 5/76* (2013.01); *H04N 5/781* (2013.01); *H04N 21/4147* (2013.01); *H04N 21/44204* (2013.01)

(58) Field of Classification Search
CPC .......... H04N 21/4335; H04N 21/4147; H04N 21/44204; H04N 5/781; H04N 5/76
See application file for complete search history.

(56) References Cited

U.S. PATENT DOCUMENTS

| | | | |
|---|---|---|---|
| 6,553,180 B1 * | 4/2003 | Kikuchi et al. ............... | 386/241 |
| 6,609,144 B1 | 8/2003 | Inoue et al. | |
| 6,775,461 B2 | 8/2004 | Poslinski et al. | |
| 7,088,910 B2 | 8/2006 | Potrebic et al. | |
| 7,181,128 B1 | 2/2007 | Wada et al. | |
| 7,216,207 B1 | 5/2007 | Armstrong-Crews et al. | |
| 7,519,627 B2 | 4/2009 | Malloy | |
| 7,571,454 B2 | 8/2009 | Potrebic et al. | |
| 7,584,497 B2 | 9/2009 | Potrebic et al. | |
| 7,593,621 B2 | 9/2009 | Ju | |
| 7,640,566 B1 | 12/2009 | Taylor et al. | |

(Continued)

FOREIGN PATENT DOCUMENTS

| | | |
|---|---|---|
| EP | 1134976 A2 | 9/2001 |
| EP | 1624446 A1 | 2/2006 |

(Continued)

OTHER PUBLICATIONS

Krishna Prasad Panje, U.S. Appl. No. 12/847,035, filed Jul. 30, 2010.

(Continued)

*Primary Examiner* — Tat Chio
(74) *Attorney, Agent, or Firm* — Fish & Richardson P.C.

(57) ABSTRACT

A method of managing video programs and associated program components on a storage unit of an electronic device is provided. A total number of playbacks of each video program stored in the storage unit and a total number of playbacks of each program component stored in the storage unit for each of the video programs are tracked. A percentage of playbacks of each program component stored on the storage unit relative to the total number of playbacks of its corresponding video program is determined. From this, candidates of program components for deletion from the storage unit are identified based on the values of the determined percentages. The tracking, determining and identifying steps of the method are performed by electronic components of the electronic device. A device is also disclosed.

17 Claims, 4 Drawing Sheets

(56) References Cited

U.S. PATENT DOCUMENTS

| | | |
|---|---|---|
| 7,646,962 B1 | 1/2010 | Ellis et al. |
| 7,889,973 B2 | 2/2011 | Poslinski et al. |
| 7,987,148 B2 * | 7/2011 | Hangartner et al. ............ 706/46 |
| 8,335,423 B2 * | 12/2012 | Taniguchi ..................... 386/230 |
| 2002/0110353 A1 | 8/2002 | Potrebic et al. |
| 2004/0091239 A1 | 5/2004 | Poslinski et al. |
| 2004/0109668 A1 | 6/2004 | Stuckman |
| 2006/0143644 A1 | 6/2006 | Verhaegh et al. |
| 2007/0166014 A1 | 7/2007 | Schwarzmann |
| 2008/0101764 A1 | 5/2008 | Johannesson et al. |
| 2008/0307481 A1 | 12/2008 | Panje |
| 2008/0313016 A1 | 12/2008 | Panje |
| 2010/0092160 A1 | 4/2010 | Bhogal et al. |
| 2010/0131985 A1 | 5/2010 | Panje |
| 2010/0257070 A1 | 10/2010 | Panje |
| 2010/0268680 A1 | 10/2010 | Hangartner et al. |
| 2010/0275228 A1 | 10/2010 | Panje |
| 2012/0321271 A1 * | 12/2012 | Baldwin et al. ............... 386/201 |

FOREIGN PATENT DOCUMENTS

| | | |
|---|---|---|
| JP | 2010-246016 | 10/2010 |
| WO | 2004036907 A1 | 4/2004 |

OTHER PUBLICATIONS

PCT Search Report & Written Opinion, RE: Application #PCT/US2012/044026, Sep. 25, 2012.

Office Action issued in European Application No. 12731279.1 on Mar. 16, 2015, 4 pages.

Office Action issued in Korean Application No. 10-2013-7033857 on Feb. 6, 2015, 11 pages (with English translation).

* cited by examiner

METHOD AND DEVICE FOR OPTIMIZING STORAGE OF RECORDED VIDEO PROGRAMS

FIELD

Managing data recorded in an electronic device having a pre-determined amount of storage capacity or memory is described and, more particularly, the manner in which data is deleted or archived during a procedure to free a desired amount of memory is described.

BACKGROUND

Digital Video Recorders (DVRs) and like consumer electronic devices used in connection with the storage or playback of video programs, such as television shows, movies, and the like, may have a pre-determined and pre-defined amount of storage capacity or memory for use in storing a given amount of video or multimedia program data and associated data or files and the like. Such data may be obtained via various media delivery systems such as transport streams (TS) via Internet Protocol TV (IP-TV), video-on-demand (VOD), and like services provided via network connections, subscriptions and the like or via connection or communication with other devices. The above systems may enable a user or subscriber to record or save a video or multi-media program or like content in storage as electronic data so that the program may be played and viewed at a later time at the viewer's convenience.

Simply for purposes of example, and not by way of limitation, a typical electronic device such as DVR may have a pre-determined amount of internal storage capacity or memory sufficient to store numerous different video programstotaling several to several tens of hours or more of content. Of course, different electronic devices may be designed and manufactured to have more or less storage capacity/memory. Nonetheless, such electronic devices will have a pre-determined and finite amount of storage capacity and will be expected to become or closely approach full capacity at some point in time during normal use.

Further, when a DVR or like device records a video program, for instance via a network connection to a service provider, the DVR will typically automatically record an entire transport stream (TS) associated with the video program. Thus, the video program and all associated content are typically packaged as a single program on a single transport stream (SPTS) with different associated contents identified with different program identification numbers (PIDs). As technology advances, the contents of such video programs are becoming increasing more data intensive and complex having a greater number of associated components. For instance, a video program or component provided in high definition (HD) will require significantly more storage space than regular definition programs and components. Thus, the repository systems of DVRs and like consumer electronic devices for these recordings are also necessarily being provided with expanded memory to handle this greater amount of data.

In addition, it is not only the format (i.e., HD) of the video content that is increasingly becoming more intensive, but also the content with respect to the plurality of associated information. Simply by way of example, and not by way of limitation, the associated information for a video program may include many different language audios, subtitle and/or closed caption information, several different camera angles, different director's cuts/specials, commentary and alternative targeted content. Accordingly, when a user desires playback of such a recording, specific components of the TS or SPTS can be parsed together and presented to the user based on user choice, for instance, audio language, camera angle, and the like. A consequence of recording the entire TS or SPTS is that the recording of this data requires a greater amount of memory or storage space and, if some of the program components of a particular video program are never or only very frequently presented for viewing, such unused components take up storage space thereby limiting space available for additional or future recordings of other video programs.

Thus, regardless of the amount of storage capacity of a DVR or like consumer electronic device, it will likely eventually become full or close to full having recordings of many different programs and associated content having been collected over a period of time. The status of available storage capacity or memory is generally unknown to the user or users of a DVR and is only made known to the user when the DVR or like device provides a prompt or indication to the user with respect to deleting at least some of the currently stored content to make a sufficient amount of memory available for the recording of additional content.

A traditional solution with respect to freeing-up storage space includes providing a list of content to the user so that the oldest dated content is offered to the user as a first possibility for deletion. This typically only occurs when there is lack of space for new content to be recorded. Such memory management systems typically enable the user to mark or lock some content that is not desired for deletion so that the selected content cannot be accidentally deleted. As another alternative, when a DVR runs out of storage space for new recordings, the user may be able to manually browse through a list of the recorded content based on categories and genre folders or the like and manually mark content for deletion.

A problem with the above described techniques for managing recordings is that as the storage capacity of the DVR is increased and the total number and content of files on the DVR increases, it becomes increasing more difficult for the user to route through, remember, and decide which content is to be deleted to make room for new content to be recorded. Accordingly, there is a need for a method, apparatus and system which aid a user in readily and quickly deciding which recorded content among a large amount of content items is to be deleted to free a sufficient amount of memory.

SUMMARY

This disclosure describes a method of managing video programs and associated program components on a storage unit of an electronic device. A total number of playbacks of each video program stored in the storage unit and a total number of playbacks of each program component stored in the storage unit for each of the video programs are tracked. A percentage of playbacks of each program component stored on the storage unit relative to the total number of playbacks of its corresponding video program is determined. From this, candidates of program components for deletion from the storage unit are identified based on the values of the determined percentages. The tracking, determining and identifying steps of the method are performed by electronic components of the electronic device.

This disclosure also describes a device for recording video programs and associated program components in memory. The device has at least one electronic data processing unit for receiving video programs from an external source. Each of the video programs has a plurality of associated program components. The device also includes a storage unit into which the data processing unit stores and retrieves for playback the video programs and associated program components. The storage unit has a pre-determined memory capacity. The device further has a storage management module for determining a percentage of playbacks of each of the program components relative to a total number of playbacks of its corresponding video program and for identifying candidates of program components for deletion from the storage unit based on the determined percentages.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

A DVR or like consumer electronic device that enables the storage of video programs can be provided with such video programs via various external sources. For example, program providers such as multiple system operators, television networks and stations, cable TV operators, satellite TV operators, studios, wireless service providers, and Internet broadcasters/service providers, among others, operate broadband communication systems enabling the delivery of video programs and like multimedia content to consumers over networks or the like via digital or analog signals. In turn, consumer devices, such as set-top boxes (STBs), media centers, digital video recorders (DVR), personal computers (including desktop, lap top, tablet or pad computers), televisions, portable electronic devices (including smart phones), and like customer premises equipment (CPE) are adapted to receive and render delivered multimedia programming via an associated display monitor. Most consumer devices have the ability to store at least some pre-determined amount of video or multi-media programs permitting the user to view the programs at a time determined by the user.

Figure 1:
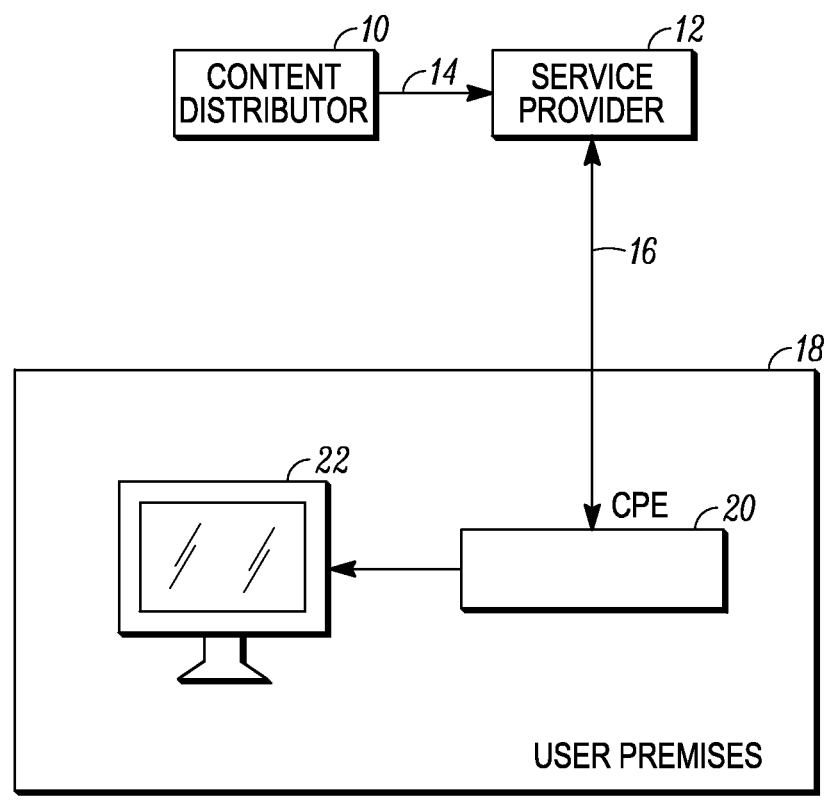
FIG. 1 is a schematic view of a system for delivering content from a service provider to an end user.

By way of example, an embodiment of a simplified example of a system for delivering, storing and rendering a video program is shown in FIG. 1. The relatively simple arrangement in FIG. 1 includes a content distributor 10 capable of transmitting media content to a service provider 12 via a signal 14. The service provider 12 has a network 16 to which a user premises 18 is connected. The user is a subscriber of the service provider 12 and is able to request and/or receive media content in the form of signals from the content distributer 10 via the service provider 12 and the service provider's network 16. The user premises 18 has one or more items of customer premise equipment (CPE) connected to receive and render transmissions from the service provider 12 and/or transmit requests to the service provider 12 via upstream communications on the network 16.

In FIG. 1, the illustrated CPE is a set top box (STB) 20 having DVR capabilities or a built-in DVR. The STB/DVR 20 is connected to a display monitor 22, such as a high definition digital television, on which video and audio can be played so that a desired video program can be viewed by the end user. The above described arrangement is provided by way of example only, and numerous other arrangements which are both simpler and far more complex are also contemplated.

In operation, the service provider 12 receives media content by way of signal 14 from the content distributor 10 and at some point in time transmits the media content to the STB/DVR 20 or other CPE on the user premises 18 by way of signal or TS over the network 16 which is provided via cable as illustrated but could also be wireless. A user may view the transmitted content immediately via monitor 22 and/or may have the option of recording the media content in the internal memory of the built-in DVR of the STB 20. The internal memory will be of a pre-defined and pre-determined capacity, and it is expected that at some point in time the internal memory will use all or a large majority of available memory. At this time, a user will be prevented from recording additional video programs without taking action with respect to deleting some items from memory to free up an amount of storage space/memory sufficient to successfully achieve the next desired new recording.

It should be understood that although a set-top box (STB) 20, such as a High-Definition STB (HD STB) having a built-in Digital Video Recorder (DVR) is referenced above, the STB 20 in FIG. 1 could be any type of electronic device or customer premises equipment (CPE) that is capable of receiving and recording a transport stream (TS) or single program transport stream (SPTS) of a video program or like content. For instance, the electronic device may be a stand-alone DVR, a digital television having a built-in DVR, a gaming console with DVR capabilities, a desk top computer, a lap top computer, a tablet or pad computer, a hand-held electronic device or smart phone having a display screen, an electronic data or file storage device, or any other device used in connection with storing electronic data such as video programs. In addition, the source of the video program may be any type of provider via any type of transmission or may be from another interconnected electronic device such as another CPE device. FIG. 1 is provided merely as an example. For purposes of this disclosure, a digital video reorder (DVR) will be used herein as generically referring to all the above described electronic devices (i.e., STB, CPE, etc.) that have DVR-like capabilities with respect to storage of video programs.

For purposes of example and not by way of limitation, the media or video program transmitted to the DVR (such as STB 20) can be of MPEG1/2/4 format and the transport stream can be MPEG2 TS. Other formats and types of transport streams may be used. The recording made by the DVR is of the entire video program including the main program and any other associated components and is via a Single Program Transport Stream (SPTS). Simply for purposes of example for this disclosure, a video program may be provided as a SPTS having a service number 0x1234 and include the following PIDs:

PID no. 0x1111=Main Video content;
PID no. 0x1112=English Audio;
PID no. 0x1113=Spanish Audio;
PID no. 0x1115=Subtitle/data;
PID no. 0x111a=close up camera angle1 video;
PID no. 0x111b=close up camera angle2 video;

PID no. 0x1117=Targeted splice Video content1;
PID no 0x1118=Targeted splice audio content1; and
PID no 0x1119=Scene description metadata.

When the user instructs or sets the DVR or like device to record the above referenced video program, the DVR receives the SPTS with all the PIDs and stores the video program with all its PIDs it in its internal memory. The above referenced video program, transport stream, and PIDs are provided as an example only and an SPTS may provide considerably more PIDs and associated components.

Figure 2:
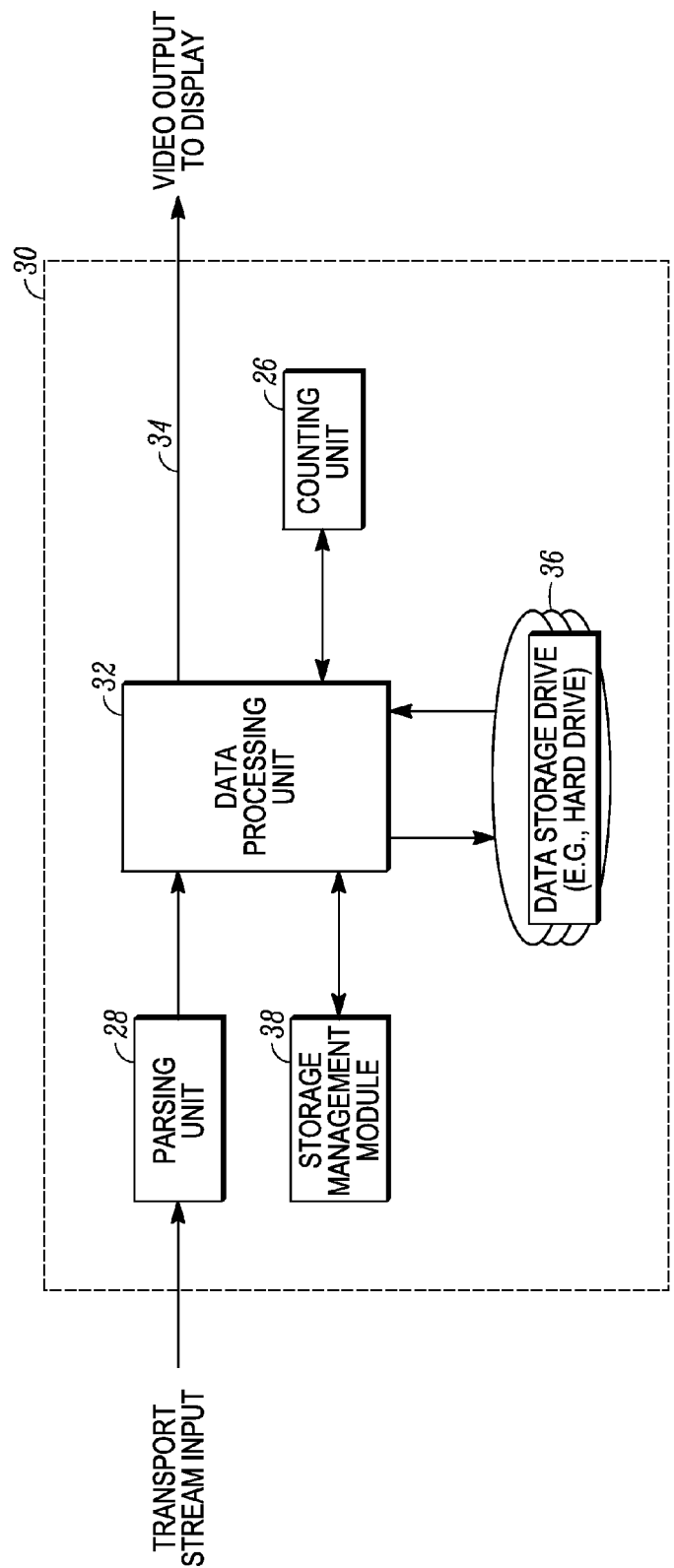
FIG. 2 is a schematic view of a DVR having a storage/memory unit.

FIG. 2 provides a simplified embodiment of a CPE such as a STB or DVR 30. The transport stream (TS) is received and processed by at least one data processing unit 32 of the DVR 30. The DVR 30 may include a parsing module 28 used to separate media content from the transport stream into separate components so that the different PIDs can be stored/deleted individually and can be parsed together with other PIDs during playback. The data processing unit 32 may output such parsed video and/or audio signals 34 to be played/displayed on a monitor and/or may store the parsed components in data storage unit or drive 36 such as a memory module, hard drive, optical or magnetic disk drive, RAM, ROM, EEPROM, CD-ROM or any other electronic data storage device or media. The DVR 30 may also have connections to external storage units or memory modules (not shown) that may provide additional "local" or "remote" external storage and memory options.

For the purpose of managing the storage of content, the DVR 30 includes a storage management module 38 which may be provided as a processor or the like having software enabling continual or periodic clean up of the storage unit 36. The storage management module 38 and its software may be set to perform storage clean up functions, for example, based on at least one of the following events: when a clean-up command is received by the user; when available memory of the storage unit 36 is reduced to a low level (i.e., the storage unit is near full capacity); when storage space on the storage unit 36 is periodically scheduled to be freed; or automatically and continually in the background during normal operation of the DVR 30. Accordingly, the oversight of the functions provided by the module 38 may be set to be operated "manually" via prompts directed to and/or instructions received from the user or may semi-automatic or automatic without requiring significant user intervention.

The storage management module 38 via its software can constantly keep track of the number of shows or plays of each video program stored in the storage unit 36 and uses of each associated component of the video program. For example, the DVR 30 may include a counter module 26 that is used to increment play counts associated with playback of each video program and component parsed together for playback. This information is stored in the DVR 30 and is available to the module 38 or is stored directly in the module 38.

From the counter information, the processor 38 is able to determine the percentage of shows/plays of each program component relative to the total number of shows/plays of the video program itself. In this manner, the software is able to develop a listing of video programs and associated components with show/play counts or percentages which can be arranged, for instance, in decreasing order. Thus, by presenting such a list to a user, the user is able to quickly have an understanding as to which associated components are viewed frequently, minimally, or not at all when a particular video program is played. This provides the user with a means for determining which files or data, namely associated components of a video program, may be removed (i.e., the associated components with the lowest show/play percentages). By way of example, those with the lowest percentages of playback can iteratively be removed until a requisite amount of memory is freed and made available, for instance, to store a new video program.

The above procedure can be manual requiring the user to respond and confirm instructions or can be automatic without requiring user interaction. The module 38 and its software can optionally accomplish other tasks such as generating and storing information including text from program description in metadata of deleted components or components that may be suggested for deletion. As an alternative or in addition to deleting selected components, the software can also archive some components to external storage units, such as other local or remote storage units, and can aid in the determination and mark which components should be archived instead of solely deleted.

As stated above, each PID of a particular video program is associated with a show count and this information is stored in the DVR. Each video program is also associated with a show count which is stored in the DVR. Accordingly, for each playback of a particular program, the module 38 and its software and/or a counter module 26 on the DVR 30 can increment the show count associated with the PID used as well as the show count of the video program played. Thus, for instance, when the DVR runs out of space, the software may automatically (without user interaction) or manually (with user interaction) delete the components which are shown/played/used substantially less in terms of percentage of play than the other components of that particular video program for purposes of freeing storage space for new recordings or other purposes.

Figure 3:
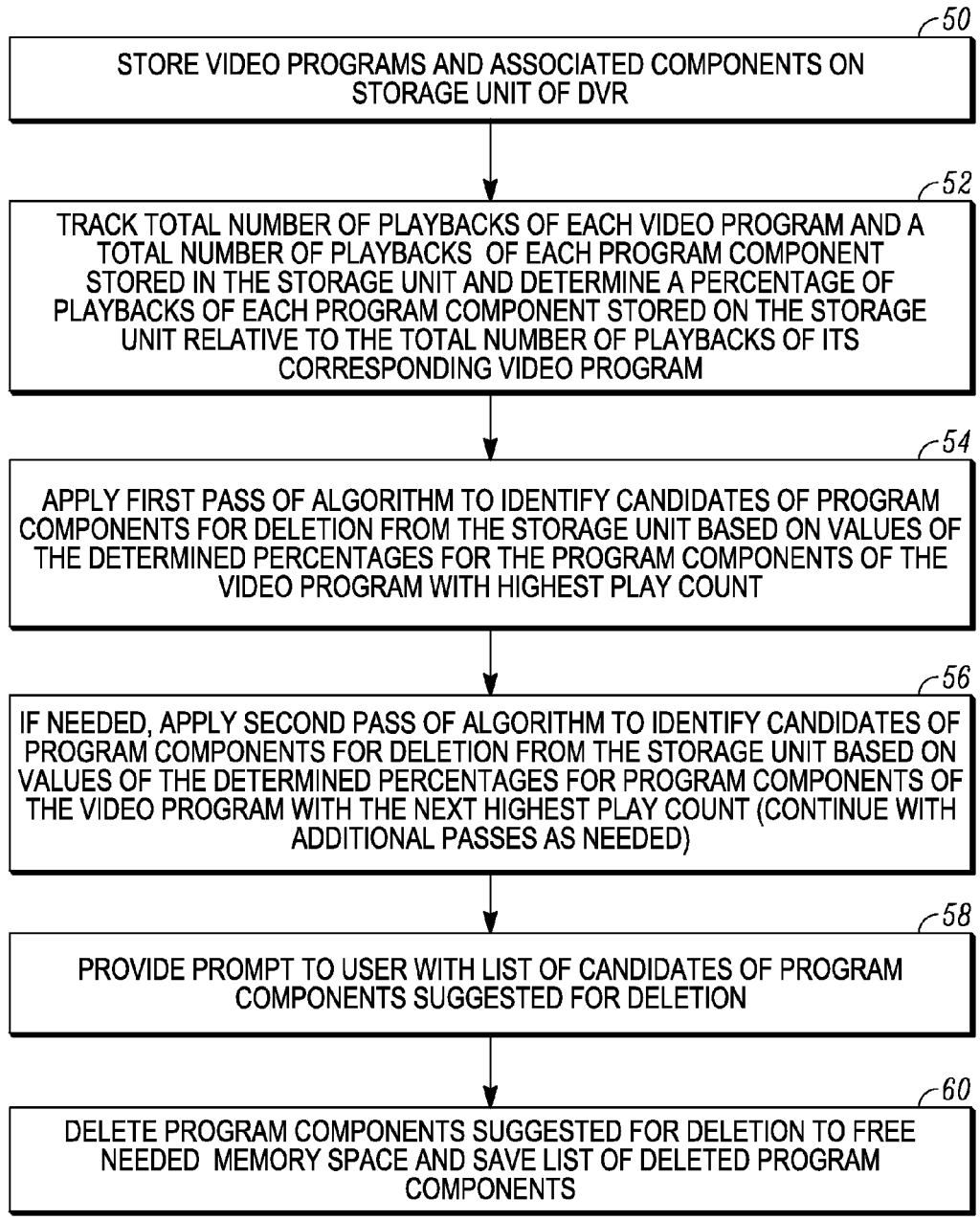
FIG. 3 is a flowchart of a method for freeing memory of a DVR.

Referring to FIG. 3, each program on the DVR 30 is identified with a unique ID and stored on the DVR storage drive 36, such as a hard disk drive, memory module or the like. See step 50. Whenever the user plays a video program, the play count of the video program is incremented and the play count of each PID which is selected for use by the user for that playback is also incremented. The incremented play counts are stored on the storage drive 36. See step 52.

By way of example, if the user plays the program 0=1234 (previously described by way of example above) for the first time, the play count is updated from zero for all components (PIDs) to as shown below in Table 1. In this example, the user parses together and plays the main video with the main audio and subtitles. The stored count values of the video program and the PIDs for the main video, the main audio and the subtitles are incremented by one while the non-played PIDs remain at zero. See Table 1.

TABLE 1

| Program ID | Program Playcount | Program PID No. | Program PID No. Playcount | Description |
|---|---|---|---|---|
| 0x1234 | 1 | 0x1111 | 1 | Main video |
|  |  | 0x1112 | 1 | Main Audio |
|  |  | 0x1115 | 1 | Subtitle |
|  |  | 0x1113 | 0 | Spanish audio |
|  |  | 0x111a | 0 | Angle1 video |
|  |  | 0x111b | 0 | Angle2 video |
|  |  | 0x1117 | 0 | Targeted video 1 |
|  |  | 0x1118 | 0 | Targeted audio 1 |
|  |  | 0x1119 | 0 | Scene description metadata |

The above data (program play count and PID play count for this Program ID) is stored on the DVR 30 such that the module 38 is provided with such information. Over a period of time, additional playbacks of this video program may occur, although use of the different components may vary. In the present example, Table 2 shown below indicates the number of playbacks and percentage at which each of the components was used relative to the total playbacks of the video program over a period of time.

TABLE 2

| Program ID | Program Play-count | Program PID No. | Program PID No. Play-count | % of Playcount (PID playcount/ Program Playcount) | Description | Save/Archive/ Deletion Determination? |
|---|---|---|---|---|---|---|
| 0x1234 | 5 | 0x1111 | 5 | 5/5 = 100% | Main video | No (needed) |
| | | 0x1112 | 5 | 5/5 = 100% | Main Audio | No (needed) |
| | | 0x1115 | 5 | 5/5 = 100% | Subtitle | No (needed) |
| | | 0x1113 | 0 | 0/5 = 0% | Spanish audio | Candidate for Deletion |
| | | 0x111a | 1 | 1/5 = 20% | Angle1 video | Candidate for Remote network storage |
| | | 0x111b | 2 | 2/5 = 40% | Angle2 video | Candidate for Local storage on a different disk or device |
| | | 0x1117 | 0 | 0/5 = 0% | Targeted video 1 | Candidate for Deletion |
| | | 0x1118 | 0 | 0/5 = 0% | Targeted audio 1 | Candidate for Deletion |
| | | 0x1119 | 0 | 0/5 = 0% | Scene description metadata | Candidate for Deletion |

The results shown in Table 2 for this example indicate that over a period of time some program components (PIDs) of the video program (0x1234) are played a lesser percentage compared to other components of the video program. For example, the Spanish audio (PID No. 0x1113), the targeted video 1 (PID No. 0x1117), the targeted audio 1 (PID No. 0x1118), and the Scene Description Metadata (PID No. 0x1119) were never played (i.e., 0% playback) despite the video program (0x1234) being played a total of five times. These PID Nos. (0x1113, 0x1117, 0x1118, 0x1119) are ideal candidates for deletion from the storage unit 36 should space need to be freed on the storage unit 36.

In contrast, Angle1 video (PID No. 0x111a) was played 20% of the time the video program was played and, while being a candidate for deletion, may also be a candidate for remote network storage depending upon the set up of the DVR 30. Angle2 video (PID No. 0x111b) was played 40% of the time the video program (0x1234) was played and, while being a candidate for deletion, may also be a candidate for local storage on a different storage drive or device depending upon the set up of the DVR 30. Finally, the Main video (PID No. 0x1111), the Main audio (PID No. 0x1112) and the Subtitles (PID No. 0x1113) in this example were played 100% of the time the video program was played and therefore are not believed to be candidates for deletion and therefore are not identified as candidates for deletion by the module 38.

Figure 4:
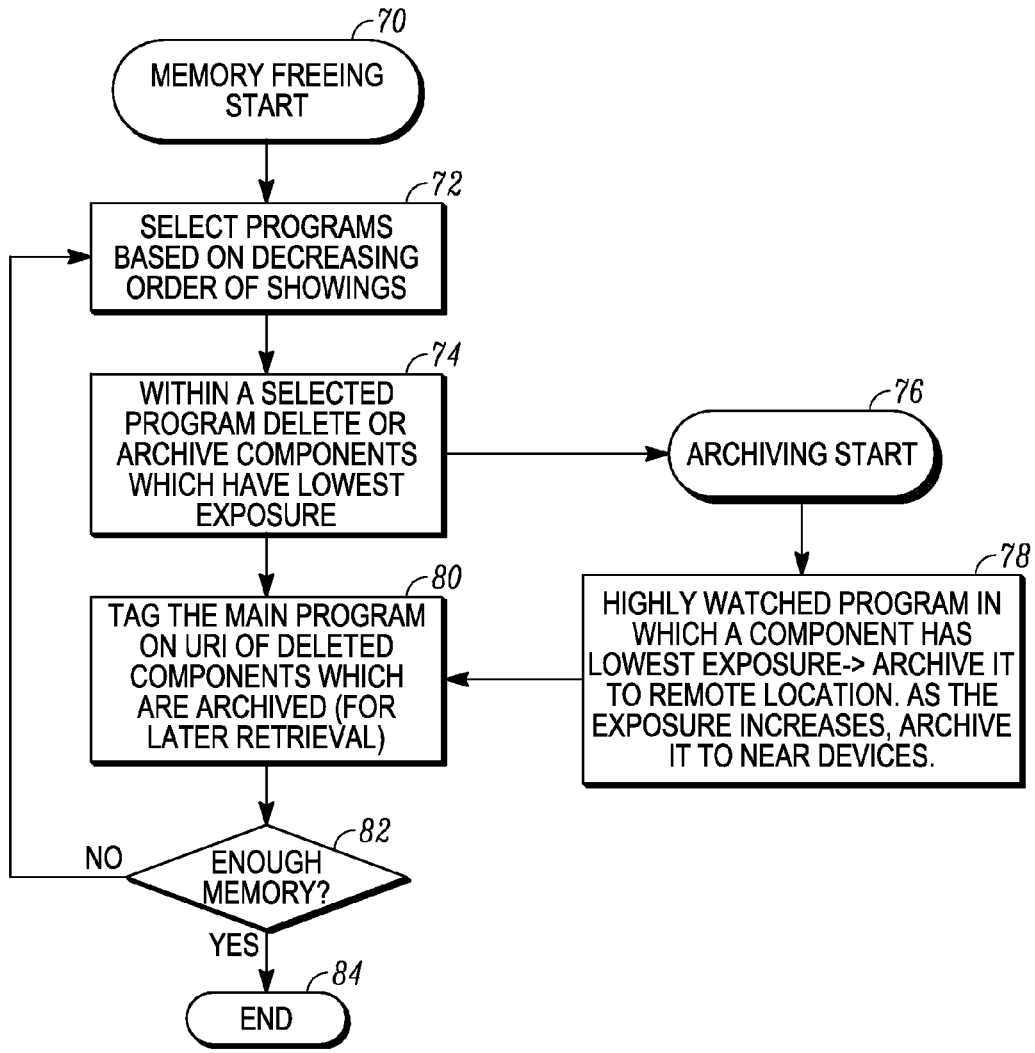
FIG. 4 is a flowchart demonstrating a memory freeing algorithm.

In step 54 in FIG. 4, an algorithm is applied as a first pass, for instance, when the DVR 30 runs out of space for a new desired recording. Of course, this may be applied at other times and may be performed automatically or upon instruction by the user. According to the algorithm, the video program or programs with the highest program play count is/are selected first. For example, if video program (0x1234) has the most playbacks, then it would be selected first. The program components of the selected video program or programs which have never been played are marked as candidates for deletion. If deleted, this should free memory of the storage unit 36 that was previously occupied. When deleted, the deletion can be carried out by the software on module 38 via a search of PID Nos. throughout the SPTS corresponding to a video program and by deleting packets identified by that PID Nos. selected for deletion. Thus, only the individual PIDs are deleted and not the entire video program or other PIDs.

Out of several stored video programs within the DVR 30, the stored video program with the highest play count having components with the lowest percentage of usage should provide components that are ideal candidates for deletion. The storage management module 38 determines that even though the video program is a favorite and viewed a fair amount of times by the user, some components associated with this favorite are never used. In contrast, there may be a stored video program on the storage drive 36 which is rarely watched having components that are always selected whenever the video program is played. Thus, although play counts may be low, the percentage of playback of a component relative to total playback of its video program may be high. The module 38 can be set to determine that this indicates that these components are not ideal candidates for deletion.

Accordingly, this first pass is applied to the example provided by Table 2 above with respect to video program 0=1234 being a video program with highest play count, the processor 38 via its software may identify for deletion the following components having PIDs with 0% play count—0x1113, 0x1117, 0x1118 and 0x1119.

In step 56 of FIG. 4, a second pass is carried out if the components (PIDs) suggested for deletion in the first pass (step 54), if deleted, will fail to free up a sufficient amount of memory, for instance, required for a new desired recording. In the second pass, video programs having the next highest total play count (relative to the play count of the video program selected in the first pass) would be selected for analysis. The components (PIDs) of this selected video program with lowest play count and which have the lowest percentage of play counts compared to other components are considered candidates for deletion and/or for being archived.

Accordingly, if this second pass is applied to the example provided by Table 2 above with respect to video program 0=1234, the processor 38 may determine that PID Nos. 0x111a and 0x111b are candidates for deletion as they have lesser percentage (20%, 40%) of play counts relative to the total number of play counts of the video program.

The above referenced first and second passes, and additional passes, may be represented as shown by the flowchart of FIG. 4. When the memory freeing procedure provided by module 38 of DVR 30 is started at 70, the first step 72 is to select a stored video program having the highest total play count of the stored video programs yet to be selected for review of components for possible deletion. The procedure continues with step 74 in which the components (PIDs) of the video program selected in step 72 are reviewed and the components (PIDs) with the lowest percentage of usage or playback, or the components (PIDs) below a set threshold percentage of usage or playback, are selected and identified as candidates for deletion. Alternatively, the selected components (PIDs) identified as candidates for deletion are selected for archiving if the DVR 30 is set up for archiving. In this case, archiving of the components (PIDs) identified as candidates for deletion in step 74 starts at step 76, and the selected components with a relatively low percentage of playback may be identified for being archived to remote storage locations whereas, components with a relatively higher percentage of playback may be identified for being archived to more local storage drives of devices. See step 78. At step 80, the video program having components (PIDs) selected for archive are tagged with respect to these identified deleted/archived components (PIDs) thereby enabling ready retrieval from archive, as needed.

At step 82 in FIG. 4, the processor 38 determines whether or not a sufficient amount of storage space will be freed assuming all identified components (PIDs) after the last pass are deleted from storage unit 36 of DVR 30. If there is a sufficient amount of space for a new recording, the procedure is terminated at step 84. If not, the procedure continues with another pass beginning at step 72. This continues until a sufficient number of components (PIDs) have been identified that if deleted from the storage drive 36 of DVR 30 would enable a new recording to be stored.

After a sufficient number of passes has been made by the processor 38 as discussed above with respect to FIG. 4 such that potential candidates of components (PIDs) for deletion/archiving can be suggested, the next step 58 (returning to FIG. 4) is for the DVR 30 to prompt the user via an associated monitor or the like with respect to the storage unit 36 being full or close to full and with respect to the potential deletion of components (PIDs) identified via the above described algorithm performed by module 38. This prompt may also include a description of each component (PID) and can also contain a segregated list of the types of the components (PIDs). The user may decide to proceed with the deletions and/or archiving or may decide not to proceed based on the provided information. Another alternative is to set the module 38 to automatically delete the components identified for deletion without user prompting or interaction.

From the above step, the software of the processor 38 on the DVR 30 could gain information with respect to the types (ascertained from the component description metadata) of components (PIDs) the user typically never plays or uses or only rarely uses. The processor can be set to automatically mark these specific types of components (PIDs) and offer all stored components of the type for deletion when storage is near full. By way of example, perhaps a specific audio language is never selected for playback by the user. Accordingly, all components (PIDs) of the specific audio language stored in the storage unit 36 could be tagged as potential candidates for deletion regardless of play counts and percentages.

In step 60, if the user agrees to delete the identified candidates of components for deletion/archiving, the module 38 causes the DVR 30 to delete the identified PID Nos. and associated packets from the storage unit 38 and creates a list providing a brief description of each of the deleted components (PIDs). The description may be text content provided by the program metadata. This list can be stored in the DVR 30 and the user or a different user may obtain the description of the deleted content so that, if the user or a different user wants to re-order the deleted content, the user or different user would know which content to re-order or retrieve from local or remote archive.

As another alternative, the storage management module 38 of the DVR 30 may mark the components (PIDs) with lower playback percentages to be automatically moved from internal or local storage drives to external storage units (esata, portal, etc.). As yet another alternative, when the DVR 30 receives a new program for recording, it may automatically not save in the storage drive 36 certain types of components which historically have had a low play count or play count percentage.

With respect to archiving, the module 38 can ensure that highly watched video programs having a component with low usage is archived to remote storage location. However, for components with slightly higher usage, such components can be archived to more local storage devices. In this manner, the degree of archiving can be controlled (i.e., remote vs. local).

Variations of the above referenced example are possible. For example, several of these steps can be made to be automatic without user intervention or can be to be manual requiring significant user intervention before any deletion or archiving. Further, the software on the module 38 performing this function can include options capable of being set by the user so that certain steps in the procedure can occur automatically or manually. Further, as disclosed above, the DVR 30 can form part of a CPE, STB, television, gaming console, computer, video player, handheld video player, smart phone, or the like device.

The units, modules and storage drives of the DVR discussed above can physically be provided on a circuit board or within an electronic device and can include various processors, microprocessors, controllers, chips, disk drives, and the like. It will be apparent to one of ordinary skill in the art that the modules, processors, controllers, units and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

I claim:

1. A method of managing video programs and associated program components on a storage unit of an electronic device, the method comprising:
   tracking a total number of playbacks of a video program stored in the storage unit;
   identifying a set of program components that are stored in the storage unit and are available to be concurrently played back with the video program during playback of the video program, wherein at least a portion of the set of components is concurrently played back with the video program during each playback of the video program;
   determining, for each program component in the set, a portion of the total number of playbacks in which the program component was played back concurrently with the video program;
   determining, for each program component in the set, a portion of the total number of playbacks in which the program component was played back with the video program; and
   deleting, from the storage unit and based on the determined portions, a given program component that was played back with the video program in a smallest portion of the total number of playbacks; and said tracking, determining and identifying being performed by electronic components of the electronic device.

2. A method according to claim 1, further comprising identifying candidate program components for deletion, wherein said identifying candidate program components includes:
   first identifying a video program having a highest play count;
   analyzing the program components of the video program having the highest play count for a program component having a lowest percentage of playback; and
   identifying the program component having the lowest percentage of playback as a first candidate for deletion.

3. A method according to claim 2, wherein said identifying candidate program components includes:
   further identifying a video program having a next highest play count that has not already been subject to said analyzing;
   further analyzing the program components of the video program having the next highest play count for a second program component having a lowest percentage of playback; and
   further identifying the second program component having the lowest percentage of playback as an additional candidate for deletion.

4. A method according to claim 3, wherein the deleting is iteratively performed on candidates until a pre-determined amount of memory is freed in the storage unit.

5. A method according to claim 3, further comprising displaying the candidates for deletion to a user for receiving instructions from the user with respect to deleting the identified candidates.

6. A method according to claim 3, further comprising deleting at least some of the candidates for deletion from the storage unit to free a predetermined amount of memory of the storage unit.

7. A method according to claim 6, further comprising generating and storing a list of program components deleted.

8. A method according to claim 3, further comprising tagging for archive to an external storage unit at least some of the candidates identified for deletion.

9. A method according to claim 8, wherein said tagging includes tagging at least some of the identified candidates, which have a lowest determined percentages, to be archived to a remote external storage unit and at least some others of the identified candidates, which have relatively higher determined percentages, to be archived to more local external storage units.

10. A method according to claim 3, further comprising:
    determining a specific type of program component of the candidates of program components identified for deletion from other different types of program components not identified as a candidate for deletion; and
    identifying all the program components stored in the storage unit of said specific type as additional candidates for deletion.

11. A method according to claim 10, further comprising recording an additional video program on the storage unit and automatically preventing storage of program components of the additional video program that are of said specified type.

12. A method according to claim 1, wherein the electronic device is selected from a group consisting of a video recorder, a set-top box, a digital television, a personal computer, a desktop computer, a laptop computer, a pad or tablet computer, a media player, and a smart phone.

13. A device for recording video programs and associated program components in memory, comprising:
    at least one electronic data processing unit for receiving, from an external source, a video program having a set of associated program components that are available to be concurrently played back with the video program during playback of the video program, wherein at least a portion of the set of associated program components is concurrently played back with the video program during each playback of the video program;
    a storage unit into which said data processing unit stores and retrieves for playback the video program and at least a portion of the set of associated program components, the storage unit having a given memory capacity; and
    a storage management module that performs operations comprising:
        determining, for each program component in the set, a percentage of a total number of playbacks of the video program in which the program component was concurrently presented with the video program; and
        deleting, from the storage unit and based on the determined percentages, a given program component that was played back with the video program in a smallest percentage of the total number of playbacks, the deleting being performed based on a specified portion of the given memory capacity being utilized.

14. A device according to claim 13, further comprising a counter module for incrementing a play count of the video program for each playback of the video program and for incrementing a play count of each of the program components concurrently presented with the video program for each playback thereof.

15. A device according to claim 13, further comprising a parsing module for receiving the video program and associated program components as a single program transport stream signal and for parsing the signal into a plurality of separate program components such that each of the separate program components are selectable for playback independent of others of the separate program components and such that each of the separate program components are deletable from the storage unit without having to delete others of the separate program components of the video program.

16. A device according to claim 13, wherein the device is selected from a group consisting of a video recorder, a set-top box, a digital television, a personal computer, a desktop computer, a laptop computer, a pad or tablet computer, a media player, and a smart phone.

17. A device according to claim 13, wherein the storage management module has software for identifying a video program among a plurality of video programs stored in the storage unit having highest play count yet to be analyzed, for analyzing the program components of the video program having highest play count for a program component thereof having a lowest percentage of playback, and for identifying the program component having the lowest percentage of playback as a candidate for deletion.

\* \* \* \* \*